US012565078B2

(12) United States Patent
Lin et al.

(10) Patent No.: US 12,565,078 B2
(45) Date of Patent: Mar. 3, 2026

(54) ELECTRIC VEHICLE AND THERMAL MANAGER THEREOF

(71) Applicants:Zhejiang Geely Holding Group Co., LTD., Zhejiang (CN); ZHEJIANG LIANKONG TECHNOLOGIES CO., LTD, Zhejiang (CN)

(72) Inventors: Bingrong Lin, Zhejiang (CN); Junbo Xu, Zhejiang (CN); Guibin Li, Zhejiang (CN); Haijiang Dai, Zhejiang (CN); Qiang Xue, Zhejiang (CN)

(73) Assignees: Zhejiang Geely Holding Group Co., LTD., Zhejiang (CN); ZHEJIANG LIANKONG TECHNOLOGIES CO., LTD., Zhejiang (NA)

( * ) Notice: Subject to any disclaimer, the term of this patent is extended or adjusted under 35 U.S.C. 154(b) by 181 days.

(21) Appl. No.: 18/540,916

(22) Filed: Dec. 15, 2023

(65) Prior Publication Data

US 2024/0116326 A1     Apr. 11, 2024

Related U.S. Application Data

(63) Continuation of application No. PCT/CN2022/093210, filed on May 17, 2022.

(30) Foreign Application Priority Data

Sep. 27, 2021     (CN) .......................... 202111138848.7

(51) Int. Cl.
B60H 1/00          (2006.01)
(52) U.S. Cl.
CPC ..... B60H 1/00278 (2013.01); B60H 1/00392 (2013.01); B60H 2001/00307 (2013.01)

(58) Field of Classification Search
CPC ............ B60H 1/00278; B60H 1/00392; B60H 2001/00307

(Continued)

(56) References Cited

U.S. PATENT DOCUMENTS

2020/0353811 A1     11/2020     Wolf et al.
2021/0138868 A1      5/2021     Bruneau et al.

FOREIGN PATENT DOCUMENTS

CN          103129349          6/2013
CN          104380028          2/2015

(Continued)

OTHER PUBLICATIONS

"Search Report of Europe Counterpart Application", issued on Oct. 22, 2024, p. 1-p. 9.

(Continued)

*Primary Examiner* — Davis D Hwu
(74) *Attorney, Agent, or Firm* — JCIPRNET

(57)          ABSTRACT

The present application provides an electric vehicle and a thermal manager thereof. The thermal manager includes a housing, and a plurality of heat transfer tube sets are accommodated in the housing, and each heat transfer tube set is used for connecting a device; a valve assembly is arranged on a front surface of the housing, and the valve assembly is provided with a plurality of valve ports; each valve port is opposite to and communicates with a second end of at least one heat transfer branch tube in a front-and-rear direction, and the two heat transfer branch tubes in a same set are each in communication with a different valve port; the valve assembly is used to selectively communicate with a different valve port when the thermal manager performs mode switching. The electric vehicle includes a motor, a battery, a radiator and the thermal manager as above.

19 Claims, 10 Drawing Sheets

(58) Field of Classification Search
USPC ........................................................ 165/202
See application file for complete search history.

(56) References Cited

FOREIGN PATENT DOCUMENTS

| CN | 105121192 | | | 12/2015 |
|----|-----------|---|---|---------|
| CN | 106061775 | | | 10/2016 |
| CN | 110439664 | | | 11/2019 |
| CN | 110481275 | | | 11/2019 |
| CN | 110861468 | | | 3/2020 |
| CN | 111602285 | | | 8/2020 |
| CN | 112046237 | A | * | 12/2020 |
| CN | 212073666 | | | 12/2020 |
| CN | 212289437 | U | * | 1/2021 |
| CN | 113232487 | | | 8/2021 |
| CN | 113276630 | | | 8/2021 |
| CN | 113829831 | | | 12/2021 |
| CN | 113829832 | | | 12/2021 |
| CN | 113829857 | | | 12/2021 |
| EP | 3214692 | | | 9/2017 |
| JP | 2008126847 | | | 6/2008 |

OTHER PUBLICATIONS

"International Search Report (Form PCT/ISA/210) of PCT/CN2022/093210," mailed on Jul. 26, 2022, with English translation thereof, pp. 1-6.

"Written Opinion of The International Searching Authority (Form PCT/ISA/237) of PCT/CN2022/093210," mailed on Jul. 26, 2022, with English translation thereof, pp. 1-9.

"Office Action of China Counterpart Application", issued on Sep. 30, 2023, with partial English translation thereof, pp. 1-9.

* cited by examiner

ELECTRIC VEHICLE AND THERMAL MANAGER THEREOF

CROSS-REFERENCE TO RELATED APPLICATIONS

The present application is a continuation of International Application No. PCT/CN2022/093210, filed on May 17, 2022, which claims priority to Chinese Patent Application No. 202111138848.7, filed with China National Intellectual Property Administration on Sep. 27, 2021 and entitled "ELECTRIC VEHICLE AND THERMAL MANAGER THEREOF". Both of the above applications are hereby incorporated by reference in their entireties.

TECHNICAL FIELD

The present application relates to the technical field of thermal management, and in particular, to an electric vehicle and a thermal manager thereof.

REARGROUND

Since an electric vehicle uses a battery as a power source, the electric vehicle has advantages of energy saving and environmental protection. At present, electric vehicles have become more and more popular in the market. In practical application scenarios, a thermal management system of electric vehicles usually needs to manage the thermal management objects such as battery pack and drive unit of electric vehicles, in order to keep temperature of these management objects within a working temperature range that allows normal operation.

In the related technology, the thermal management system includes a battery circulation line for heating or cooling the battery pack and a power circulation line for cooling a driving unit. Water, antifreeze and other heat transfer media circulate in the battery circulation line and the power circulation line.

However, the two circulation lines are independent of each other, and each circulation line is equipped with devices such as valve, pump, expansion kettle and so on. Operators need to assemble each circulation line and the devices on each circulation line separately during assembly, which makes it difficult to assemble the thermal management system.

SUMMARY

Embodiments of the present application provide an electric vehicle and a thermal manager thereof, which are used for solving the problem of difficult assembly of thermal management systems in related technologies.

In order to achieve the above object, the present application provides the following technical solutions.

One aspect of the present application provides a thermal manager of an electric vehicle, including a housing, a plurality of heat transfer tube sets are accommodated in the housing, and each heat transfer tube set includes two heat transfer branch tubes, a first end of a first heat transfer branch tube of a same set is provided to get through the housing and is used for connecting an inlet end of a device, and a first end of a second heat transfer branch tube of the same set is provided to pass through the housing and is used for connecting an outlet end of the same device; a valve assembly is arranged on a front surface of the housing, and the valve assembly is provided with a plurality of valve ports; each valve port is opposite to and communicated with a second end of at least one heat transfer branch tube in a front-and-rear direction, and the two heat transfer branch tubes in the same set are each communicated with a different valve port; the valve assembly is used to selectively communicate with a different valve port when the thermal manager performs mode switching, so as to realize connection and disconnection of a heat transfer loop in which a different device is located.

Another aspect of the present application provides an electric vehicle, including a motor, a battery, a radiator and the thermal manager as described above.

The electric vehicle and thermal manager thereof provided in the present application involve that: a housing is provided, a plurality of heat transfer tube sets are arranged in the housing, and a valve assembly is arranged on a front surface of the housing; and first ends of two heat transfer branch tubes of the same set are each provided to pass through the housing and connect with an inlet end and an outlet end of a same device, and each valve port of the valve assembly is opposite to and communicated with a second end of at least one heat transfer branch tube, the two heat transfer branch tubes in the same set are each communicated with a different valve port, and the valve assembly can connect a different valve port when a mode of the thermal manager is switched, so as to realize connection and disconnection of a heat transfer loop in which a different device is located. In this way, the valve assembly and different heat transfer tube sets are integrated to the housing to avoid installing each line and valve separately, so as to improve the assembly efficiency of a thermal management part of the electric vehicle, and help to reduce the space in the electric vehicle occupied by the thermal management part.

In addition to the technical problems solved by the embodiments of the present application described above, the technical features that constitute the technical solutions, and the beneficial effects brought by the technical features of these technical solutions, other technical problems that can be solved by the embodiments of the present application, other technical features contained in the technical solution and the beneficial effects brought by these technical features will be further explained in detail in DESCRIPTION OF EMBODIMENTS.

BRIEF DESCRIPTION OF DRAWINGS

The drawings herein are incorporated into the specification and constitute a part of the present specification, showing embodiments in accordance with the present application and, used to, together with the specification, explain the principles of the present application.

Specific embodiments of the present application have been shown through the above drawings, which will be described in more detail hereinafter. These drawings and textual descriptions are not intended to limit the scope of the concept of the present application in any way, but to illustrate the concept of the present application to those skilled in the art with reference to specific embodiments.

DESCRIPTION OF EMBODIMENTS

In order to make the purposes, technical solutions and advantages of the embodiments of the present application more clear, the technical solutions in the embodiments of the present application will be described clearly and completely in combination with the drawings in the embodiments of the present application. Obviously, the embodiments described are a part of embodiments of the present application, not all embodiments.

Figure 1:
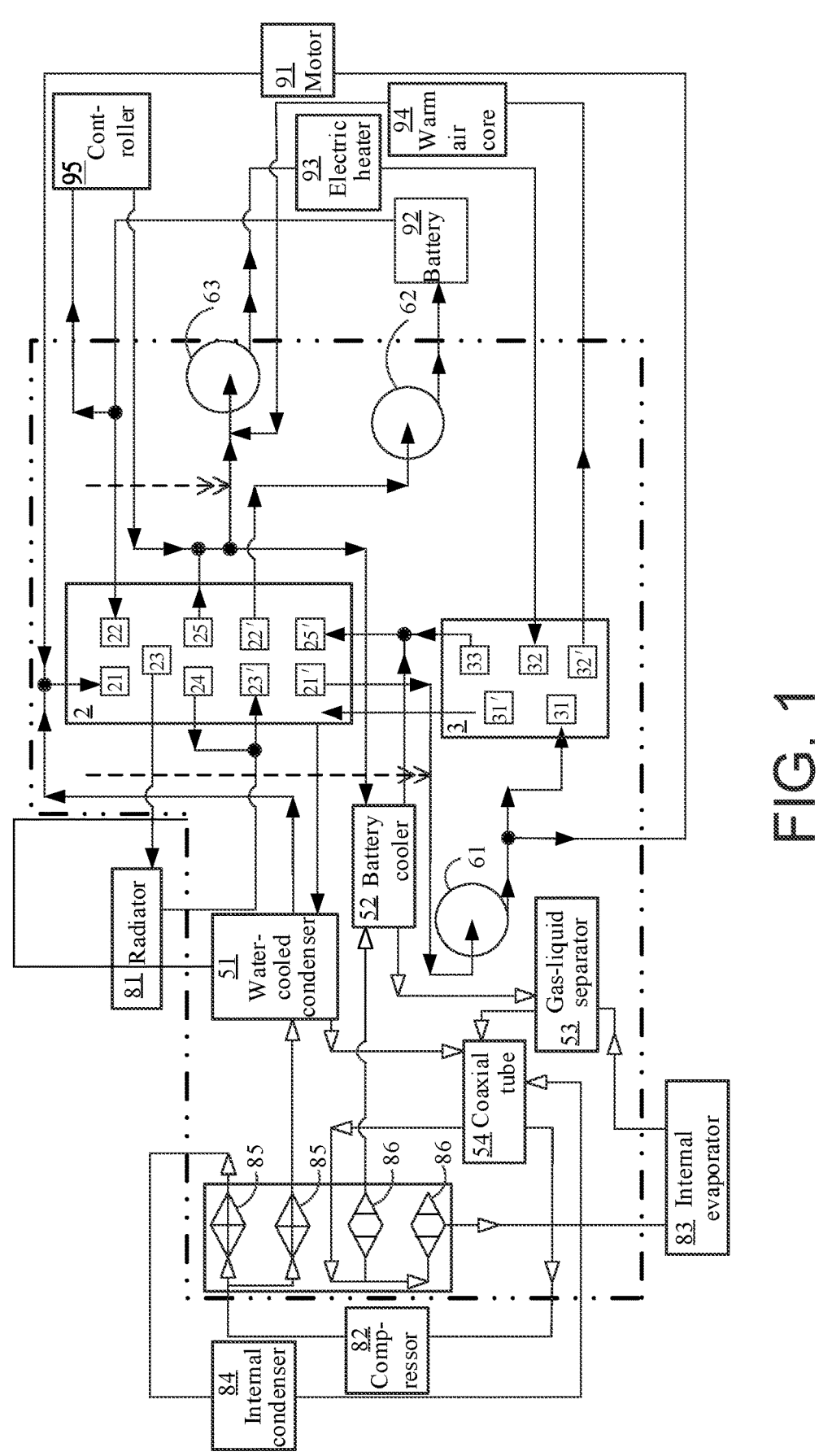
FIG. 1 is a schematic diagram of a thermal manager provided by an embodiment of the present application.

FIG. 1 is a schematic diagram of a thermal manager provided by an embodiment of the present application. The thermal manager provided in the embodiment of the present application is a part selected by double dot dash line box in FIG. 1. Referring to FIG. 1, the thermal manager may include an air conditioning part and a heat transfer part.

Where the air conditioning part may include an air conditioning line and a device arranged on the air conditioning line. Hollow arrows in FIG. 1 indicate a flow direction of cooling medium such as freon in the air conditioning line. The air conditioning part can be communicated with a compressor 82, an internal condenser 84 and an internal evaporator 83. A stop valve 85 and an expansion valve 86 on the air conditioning line can be selectively opened and closed to form different air conditioning circulation loops, thereby realizing the cooling and heating of an occupant cabin.

Figure 2:
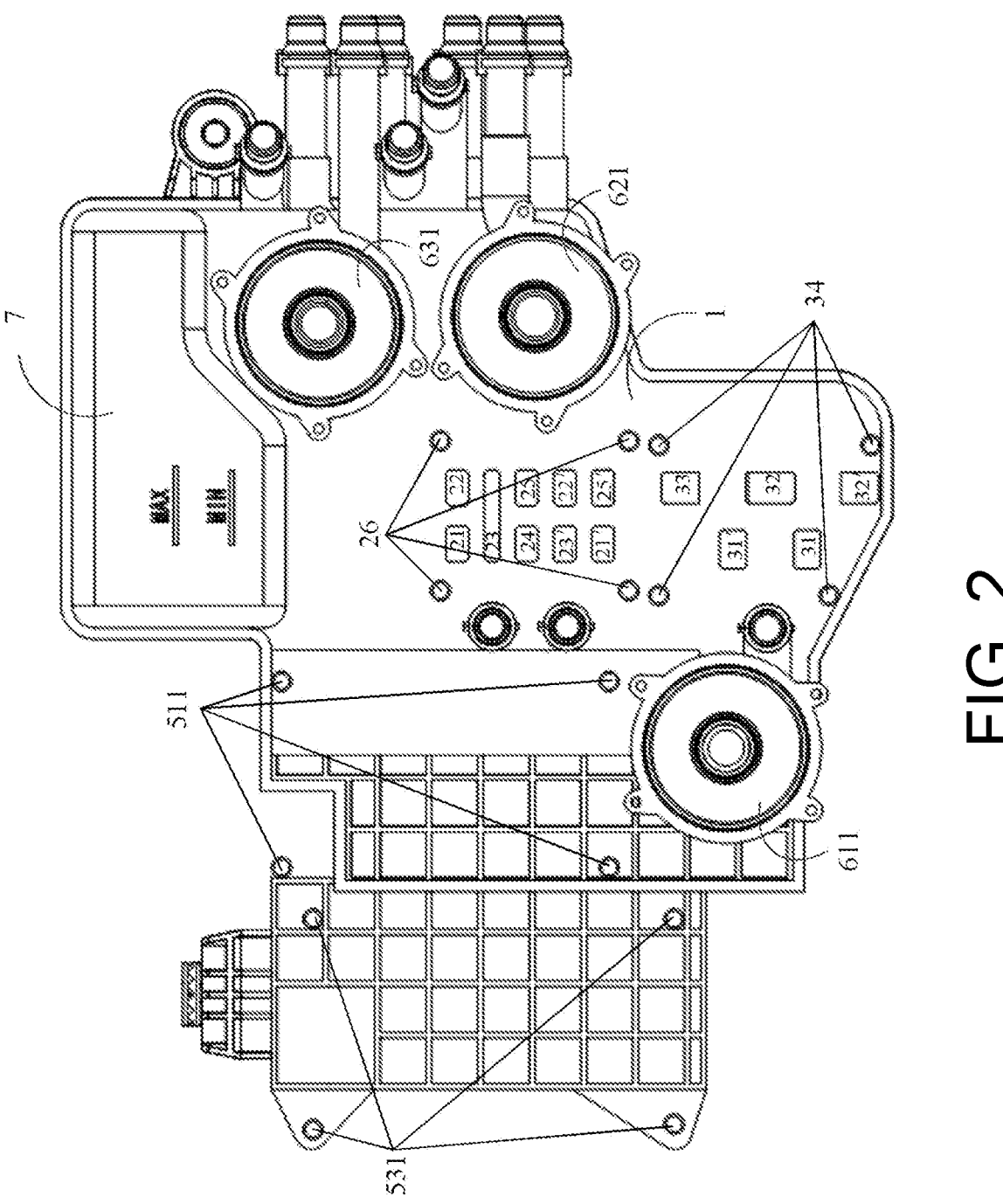
FIG. 2 is a front view of a thermal manager provided by an embodiment of the present application.

Specifically, the occupant cabin refers to a space used for accommodating drivers and passengers of an electric vehicle. The internal condenser 84 and the internal evaporator 83 may exchange heat with the occupant cabin in order to adjust the temperature of the occupant cabin. The devices arranged on the air conditioning line may include the stop valve 85, the expansion valve 86, a water-cooled condenser 51, a battery cooler 52, a coaxial tube 54, and a gas-liquid separator 53. Connecting mode between these devices can be seen in FIG. 1. Referring to FIG. 2, a front surface of the second base body 12 mentioned below may be provided with a third mounting point 531 for mounting the gas-liquid separator 53. The gas-liquid separator 53 may be arranged on left side of the water-cooled condenser 51 to communicate with a first line of the water-cooled condenser 51. In a cooling mode of the occupant cabin, the compressor 82, the internal evaporator 83 and the water-cooled condenser 51 can be communicated through the air conditioning line. In a heating mode of the occupant cabin, the compressor 82, the internal condenser 84 and the battery cooler 52 can be communicated through the air conditioning line.

In addition, the heat transfer part of the thermal manager may include a heat transfer line and a device arranged on the heat transfer line. Solid arrows in FIG. 1 indicate flow directions of heat transfer media such as water, coolant and antifreeze in the heat transfer line. The heat transfer part can be communicated with a motor 91, a battery 92, a radiator 81 and other devices to form different heat transfer circulation loops, thus realizing the thermal management of the motor 91, the battery 92 and other devices. The devices arranged on the heat transfer line may include the water-cooled condenser 51, the battery cooler 52, and a valve assembly.

It should be noted that the water-cooled condenser 51 includes a first line connected with the air conditioning line and a second line connected with the heat transfer line. A cooling medium in the first line can exchange heat with a heat transfer medium in the second line. In the cooling mode of the occupant cabin, heat from the first line can be released into the heat transfer circulation loop through the second line. That is, in the cooling mode of the occupant cabin, the second line absorbs the heat from the first line. Where the heat in the second line can be emitted through the radiator 81 which is communicated with the heat transfer part. When the air conditioning line where the first line is located is disconnected, the first line will no longer release heat to the second line.

Similarly, the battery cooler 52 may also include a first line and a second line, the first line is communicated with the air conditioning line, and the second line is communicated with the heat transfer line. A cooling medium in the first line can exchange heat with a heat transfer medium in the second line. In the heating mode of the occupant cabin, the first line can absorb heat from the second line. If the battery 92 is hot at this time, the heat on the battery 92 can be emitted to the air conditioning circulation loop through the heat transfer circulation loop. In addition, when the air conditioning line in which the first line is located is disconnected, the first line will no longer absorb the heat from the second line. At this time, the heat of the battery 92 can be dissipated to the radiator 81 through the heat transfer circulation loop.

In addition, cooling or heating of the occupant cabin, i.e., temperature control of the occupant cabin, is determined by persons in the occupant cabin. The temperature control of devices such as the battery 92 and the motor 91 is automatically carried out by an electronic control part according to the temperatures of the devices. Taking the temperature control of the battery 92 as an example, a temperature detector can monitor the temperature of the battery 92 in real time. When an actual temperature of the battery 92 detected by the temperature detector is greater than a preset value, a heat transfer circulation loop in which the battery 92 and the radiator 81 are located can be opened; or, when the occupant cabin is in the heating mode, the heat transfer circulation loop in which the battery 92 and the battery cooler 52 are located can be opened. The temperature of the battery 92 can be reduced by the above two modes, so that the actual temperature of the battery 92 is lower than a preset value.

It is worth noting that the electric control part mentioned above may include a temperature detector such as a temperature sensor; and a control part of the valve assembly. The thermal manager mentioned in the embodiment of the present application may or may not include an electronic control part.

In addition, a battery line can be arranged on an outside of the battery 92, and the battery line can exchange heat with the battery 92 in order to control the temperature of the battery 92. The radiator 81 includes a heat dissipation line which can dissipate heat by air cooling. The battery line is communicated with the heat transfer line of the heat transfer part of the thermal manager provided by the embodiment of the present application, and the heat dissipation line is also communicated with the heat transfer line. The above-mentioned "the heat transfer circulation loop in which the battery 92 and the radiator 81 are located can be opened" actually refers to that a line of the motor 91 is communicated with the heat dissipation line through the heat transfer line to form a heat dissipation circulation loop of the battery 92. Similarly, the motor 91 \controller 95 communicated with the heat transfer line as mentioned below actually refers to a line of the motor 91 arranged on an outside of the motor 91\a control line arranged on an outside of the controller 95.

In order to facilitate an operator to assemble the thermal manager on an electric vehicle, the heat transfer lines and devices involved in the thermal manager are integrated on the housing 1 as far as possible. Layout of the heat transfer lines and the devices on the housing 1 can be designed according to the principles of small number of heat transfer lines and short heat transfer paths of the heat transfer lines, convenient assembly, small space occupied by the thermal manager and so on.

Referring to FIG. 1, it is understandable that the heat transfer lines provided on the housing 1 need to be communicated not only with devices integrated in the housing 1, such as the water-cooled condenser 51, the battery cooler 52, the valve assembly, etc., but also with devices not integrated on the housing 1, such as the motor 91, the battery 92, the radiator 81, etc.

In order to shorten the flow paths between the heat transfer lines and the devices integrated on the housing 1, communication of the heat transfer line with the water-cooled condenser 51, communication of the heat transfer line with the battery cooler 52, and communication of the heat transfer line with the valve assembly can all be a front-and-rear opposite communication mode.

Figure 3:
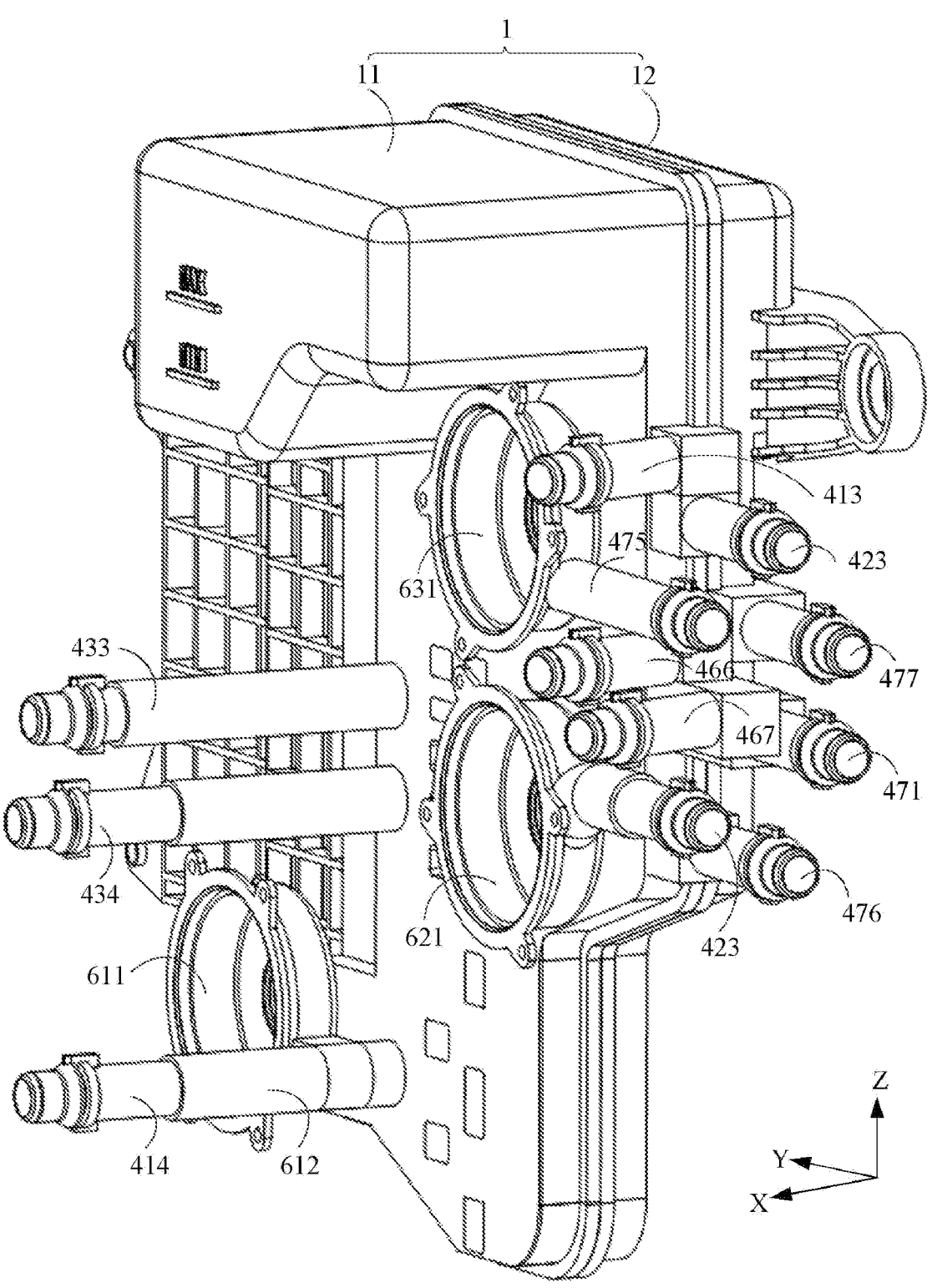
FIG. 3 is a three-dimensional schematic diagram of the thermal manager shown in FIG. 2.
Figure 4:
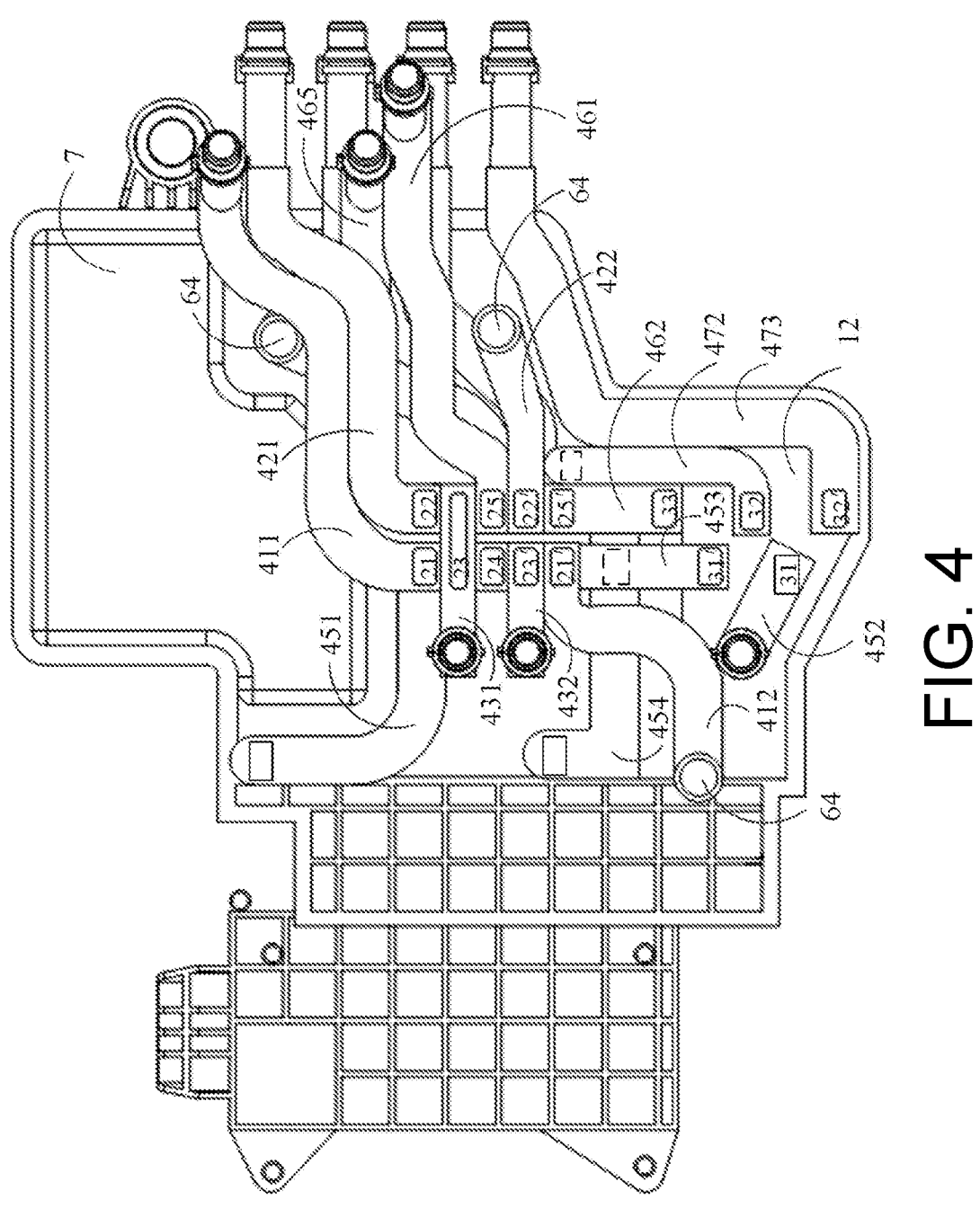
FIG. 4 is a front view of the thermal manager shown in FIG. 2 with a first base body removed.

FIG. 2 is a front view of a thermal manager provided by an embodiment of the present application. FIG. 3 is a three-dimensional schematic diagram of the thermal manager shown in FIG. 2. Referring to FIGS. 2 and 3, the housing 1 may include a first base body 11 and a second base body 12. FIG. 4 is a front view of the thermal manager shown in FIG. 2 with the first base body removed. Referring to FIGS. 2-4, the heat transfer lines may be mounted inside the housing 1 formed by the first base body 11 and the second base body 12 facing to each other and jointing together in a front to rear direction. The water-cooled condenser 51, the battery cooler 52, the valve assembly, etc., may be mounted on the front surface or rear surface of the housing 1. When laying out the devices integrated on the surface of the housing 1, a position of the valve assembly can be determined first, and then the other devices can be arranged around the valve assembly.

Herein, a direction indicated by arrow X in the drawing is a front side of the thermal manager, and an opposite direction is a rear side of the thermal manager; a direction indicated by arrow Yin the drawing is a left side of the thermal manager, and an opposite direction is a right side of the thermal manager; and a direction indicated by arrow Z in the drawing is an upper side of the thermal manager, and an opposite direction is a lower side of the thermal manager.

Exemplarily, the first base body 11 includes a front wall and a side wall, and the side wall of the first base body 11 is connected with a periphery of the front wall of the first base body 11 and extends toward the rear side. The second base body 12 includes a rear wall and a side wall, and the side wall of the second base body 12 is connected with a periphery of the rear wall of the second base body 12 and extends toward the front side. The side wall of the first base body 11 is abutted with the side wall of the second base body

12 in a front-and-rear direction to form a space for accommodating the heat transfer lines.

When connecting the thermal manager with the devices such as the motor 91 and the battery 92, in order to facilitate assembly, the heat transfer lines between the motor 91 and the radiator 81 and between the battery 92 and the radiator 81 can also be integrated on the housing 1. That is, when the thermal manager is mounted in the electric vehicle, it is only necessary to connect the battery 92 with the thermal manager and the motor 91 with the thermal manager. There is no need to provide an additional line on the outside of the thermal manager to connect the motor 91 with the battery 92.

Referring to FIG. 1, the heat transfer line includes a plurality of heat transfer tube sets, each of which includes two heat transfer branch tubes. A first end of a first heat transfer branch tube in the same set is arranged to pass through the housing 1 and is used to connect an inlet end of a device, and a first end of a second heat transfer branch tube in the same set is arranged to pass through the housing 1 and is used to connect an outlet end of the same device.

The valve assembly is provided with a plurality of valve ports. Each valve port is opposite to and communicated with a second end of at least one heat transfer branch tube in a front-and-rear direction, and the two heat transfer branch tubes in the same set are each communicated with a different valve port; the valve assembly is used to selectively communicate with a different valve port when the thermal manager performs mode switching, so as to connect and disconnect a heat transfer loop in which a different device is located.

Specifically, a first valve port of the valve assembly can be communicated with an inlet end of a first device through a heat transfer branch tube, and a second valve port can be communicated with an outlet end of the first device through a heat transfer branch tube. In this way, as long as the valve assembly controls the connection and disconnection between the first valve port and the second valve port, the connection and disconnection of a heat transfer circulation loop in which the first device is located can be controlled. In addition, a third valve port of the valve assembly can be communicated with an inlet end of a second device through a heat transfer branch tube, and a fourth valve port can be communicated with an outlet end of the second device through a heat transfer branch tube. When it is necessary to communicate the first device with the second device, the second valve port can be communicated with the third valve port, and the fourth valve port communicated with the first valve port.

In addition, the "opposite to and communicated with in a front-and-rear direction" mentioned above can be explained by referring to FIGS. 2 and 4. It should be noted at the outset that the valve assembly is not shown in FIGS. 2 and 4. For easy of understanding, a box is drawn at a position where each heat transfer line is connected with a valve pore of the valve assembly, and a number corresponding to the valve port is indicated in the box. In FIG. 2, the valve assembly can be mounted on a front surface of the first base body 11 through a first valve assembly mounting point 26 and a second valve assembly mounting point 34. The valve assembly can be provided with a plurality of valve ports. The heat transfer branch tubes are arranged in an accommodating space surrounded by the first base body 11 and the second base body 12. That is, the valve assembly is arranged on the front sides of the heat transfer branch tubes. Each heat transfer branch tube may be provided with an opening opposite to one of the valve ports. The "opposite to" refers to that a projection of the valve port on the front surface of the first base body 11 an overlapping portion with projection of the opening on the front surface of the first base body 11. A communication tube may be arranged between the valve port and corresponding opening, and the communication tube is arranged to pass through the first base body 11 and communicate the valve port with corresponding opening. By opposite communication in a front-and-rear direction, the flow paths between the valve ports of the valve assembly and the heat transfer branch tubes can be shortened.

Figure 5:
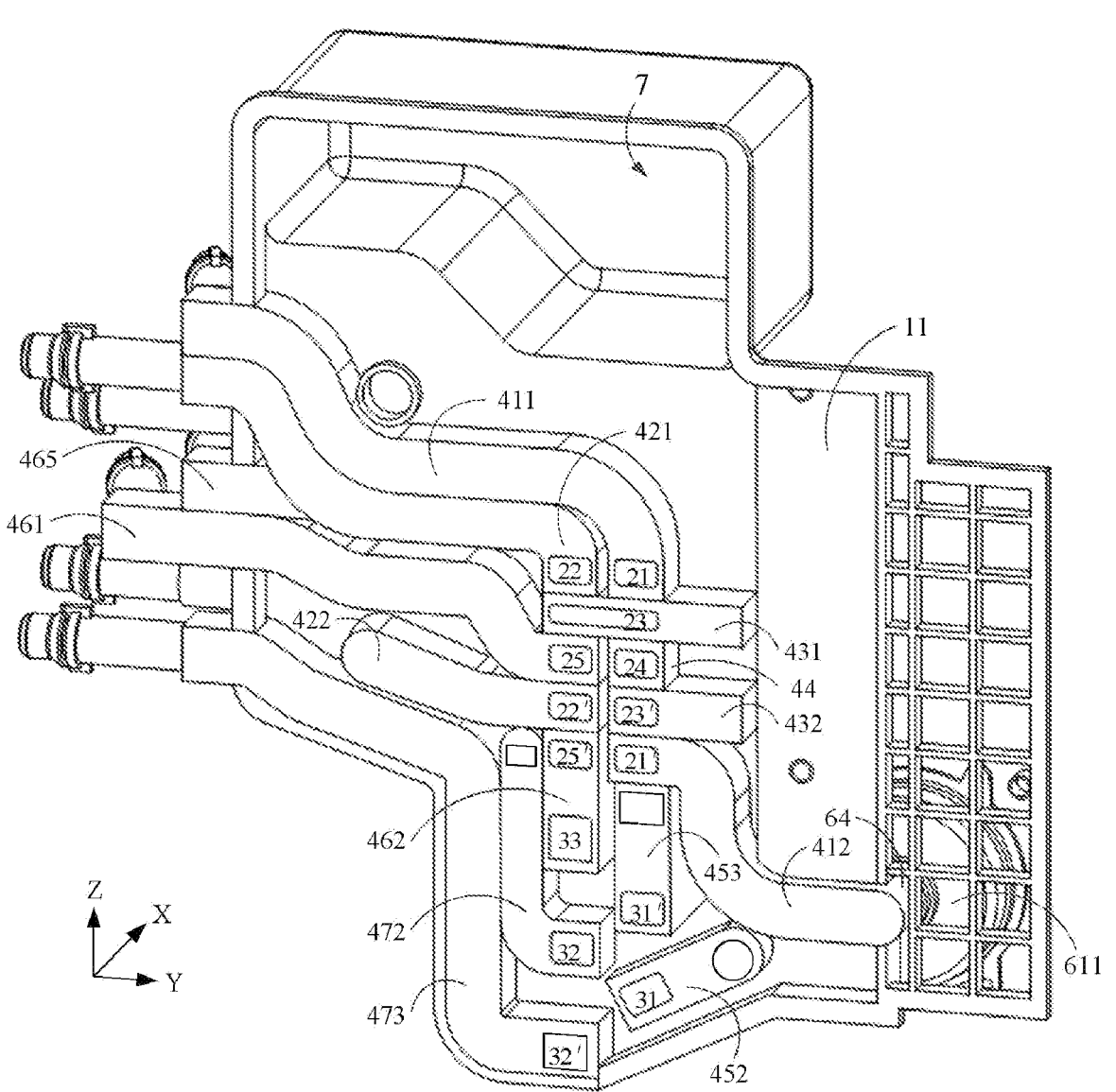
FIG. 5 is a schematic diagram of the first base body of the thermal manager shown in FIG. 2 and a heat transfer tube set arranged on the first base body.
Figure 6:
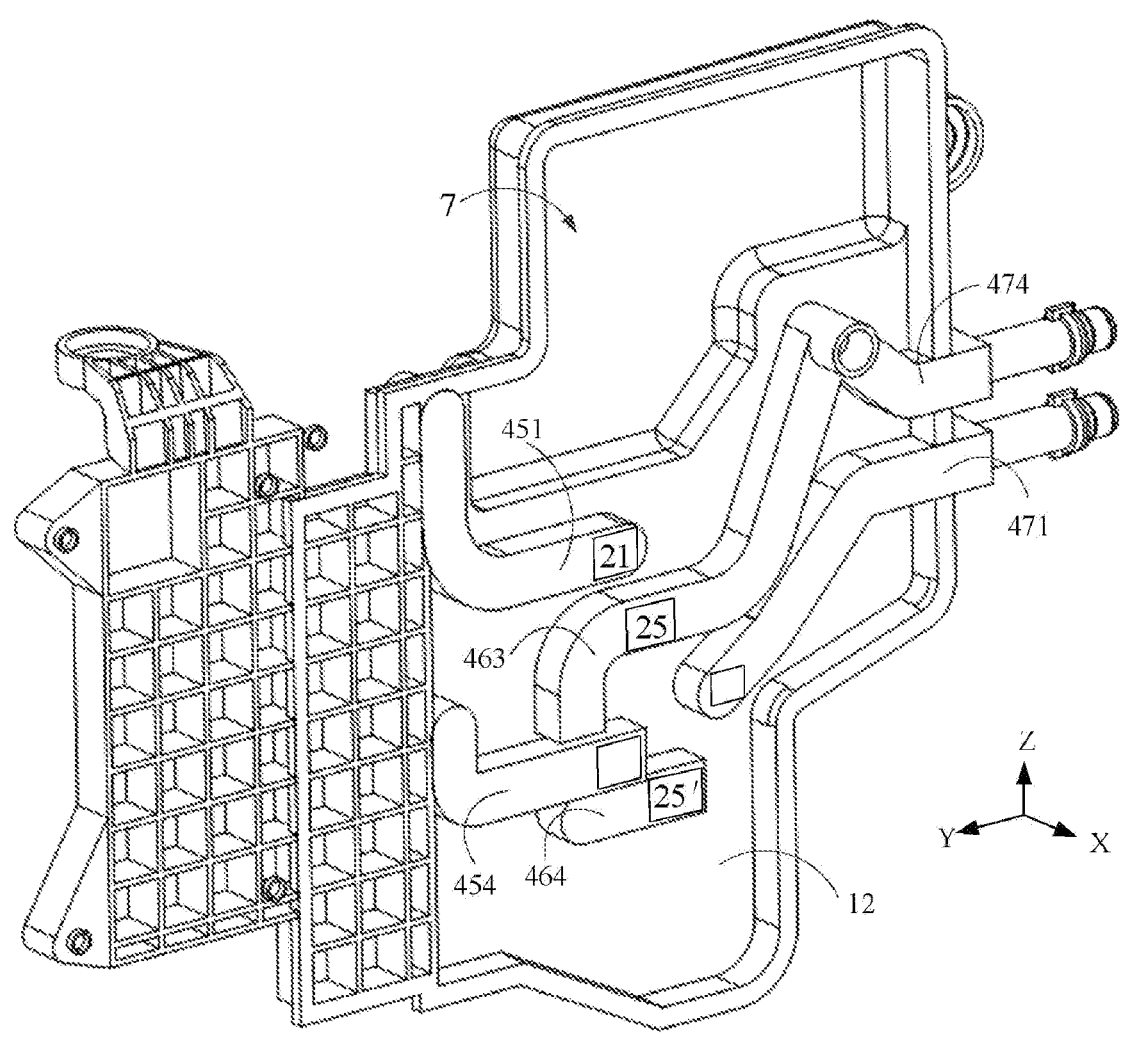
FIG. 6 is a schematic diagram of a second base body of the thermal manager shown in FIG. 2 and a heat transfer tube set arranged on the second base body.
Figure 7:
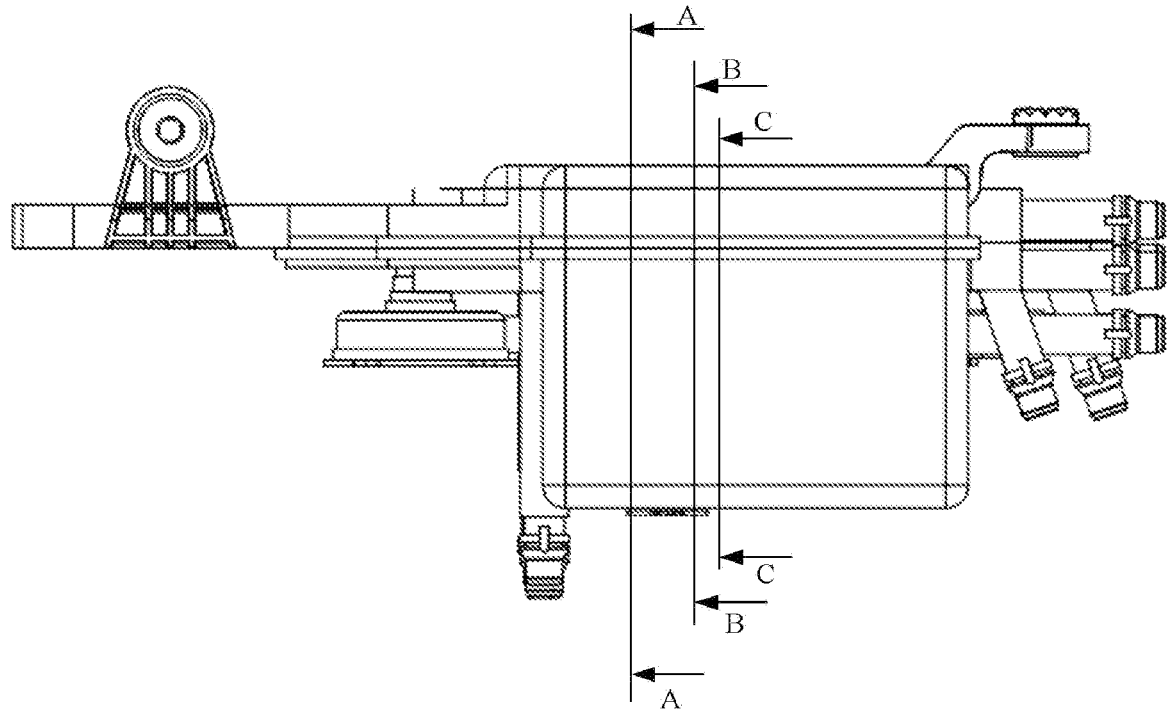
FIG. 7 is a top view of the thermal manager shown in FIG. 2.
Figure 8:
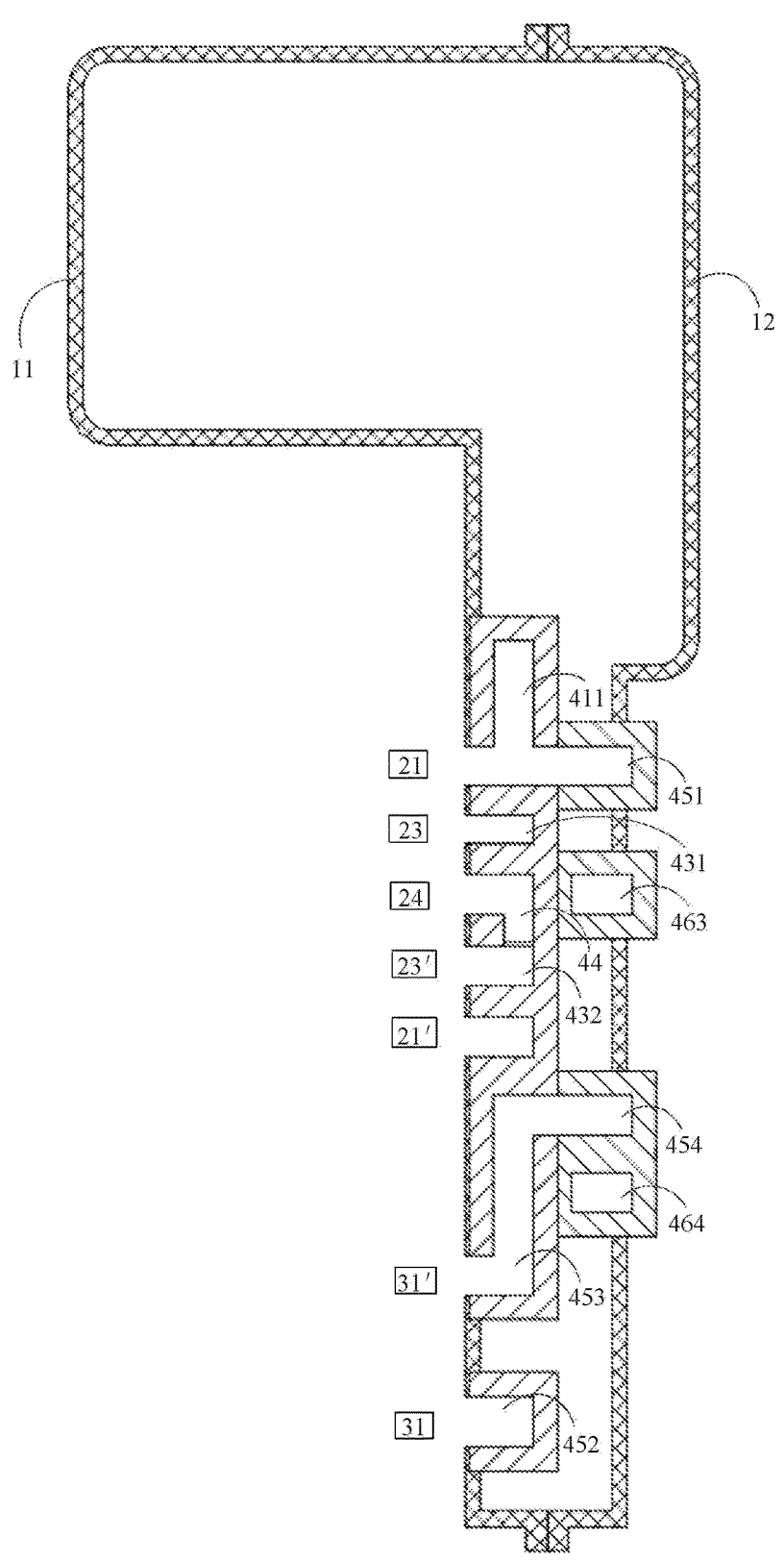
FIG. 8 is a cross-sectional view taken along A-A of FIG. 7.
Figure 9:
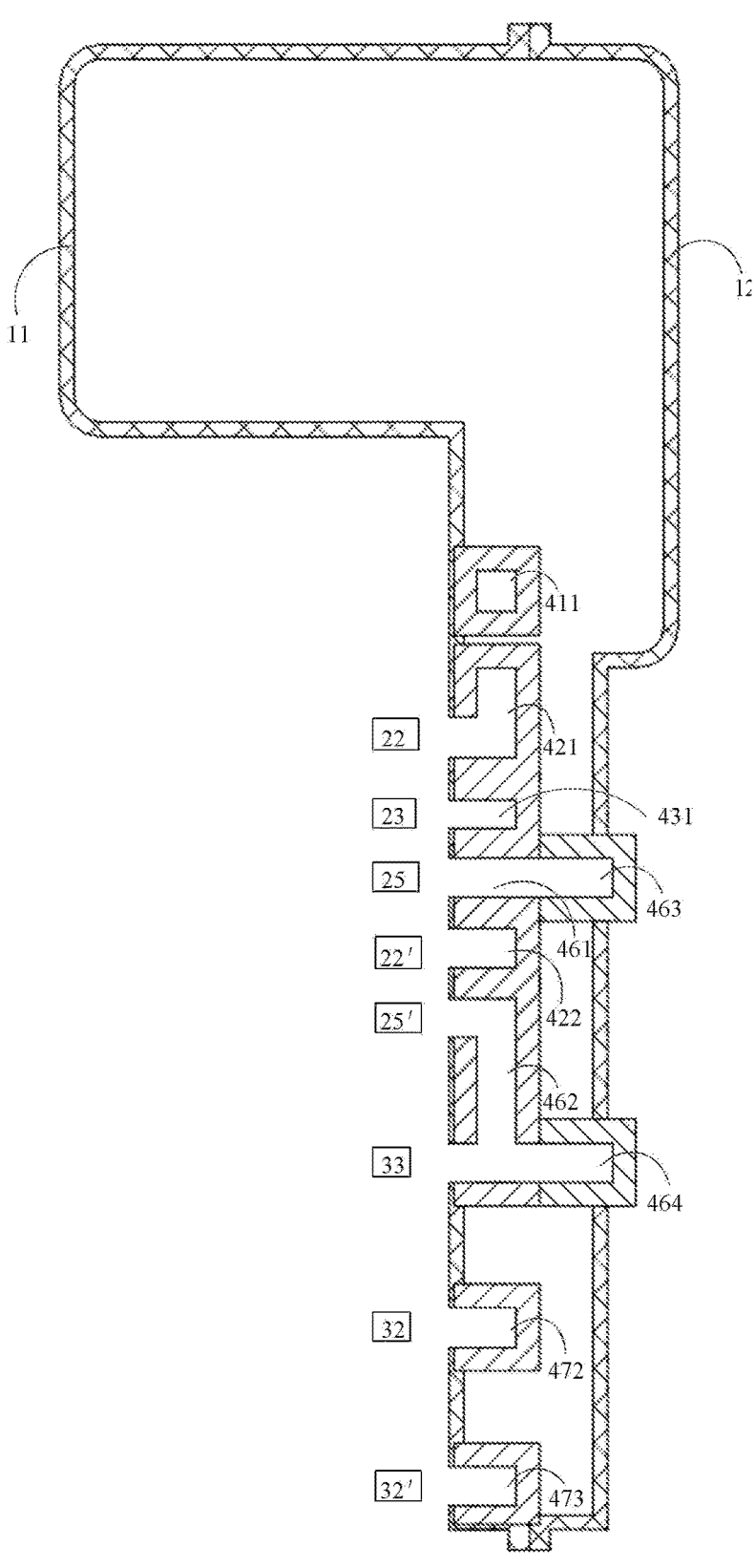
FIG. 9 is a cross-sectional view taken along B-B of FIG. 7.

FIG. 5 is a schematic diagram of a first base body 11 of the thermal manager shown in FIG. 2 and heat transfer tube sets arranged on the first base body 11, FIG. 6 is a schematic diagram of a second base body 12 of the thermal manager shown in FIG. 2 and heat transfer tube sets arranged on the second base body 12, FIG. 7 is a top view of the thermal manager shown in FIG. 2, FIG. 8 is a cross-sectional view taken along A-A of FIG. 7, and FIG. 9 is a cross-sectional view taken along B-B of FIG. 7.

Referring to FIGS. 1 and 4-9, the valve assembly may include a first side and a second side. The first side may be provided with a first motor valve port 21 and a second motor valve port 21'. The second side may be provided with a first battery valve port 22 and a second battery valve port 22'. It should be noted that the valve assembly is not shown in FIGS. 5 and 6. For easy of understanding, a box is drawn at a position where each heat transfer line is connected with the valve port of the valve assembly. A number corresponding to the valve port is indicated in the box. The boxes in FIGS. 8 and 9 represent the valve ports of the valve assembly, and the numbers in the boxes are numbers of the valve ports.

Referring further to FIGS. 1 and 4-9, a plurality of heat transfer tube sets may include a motor set and a battery pack. The motor set can be arranged in the same layer as the motor set. The motor set may include a first motor branch tube 411 and a second motor branch tube 412. The first motor branch tube 411 is used for communicating the first motor valve port 21 with the outlet end of the motor 91, and the second motor branch tube 412 is used for communicating the second motor valve port 21' with the inlet end of the motor 91.

The battery pack includes a first battery branch tube 421 and a second battery branch 422, where the first battery branch tube 421 is used for communicating the first battery valve port 22 with the outlet end of the battery 92, and the second battery branch tube 422 is used for communicating the second battery valve port 22' with the inlet end of the battery 92.

Specifically, the motor set and the battery pack are accommodated in the housing 1, and front surfaces of both the motor set and the battery pack can be fixed with the front wall of the first base body 11, and the rear surfaces of both the motor set and the battery pack are located on the same vertical surface. That is, the motor set and the battery pack have the same thickness in a front-to-rear direction.

Both when the motor set is communicated with a corresponding valve port and when the battery pack is communicated with a corresponding valve port, an opposite communication mode in the front-and-rear direction is used.

Since the motor 91 and the battery 92 are respectively arranged in different directions of the electric vehicle, in order to avoid cross-setting of lines, the two valve ports of the motor 91 can be arranged on the first side and the two valve ports of the battery 92 are arranged on the second side.

In addition, if the first motor valve port 21 is communicated with the second motor valve port 21', the first motor branch tube 411 is communicated with the second motor branch tube 412, and thus the heat transfer line in which the motor 91 is located can be conducted. If the first battery valve port 22 is communicated with the second battery valve port 22', the first battery branch tube 421 is communicated with the second battery branch tube 422, and thus the heat transfer line in which the battery 92 is located can be conducted. If the second battery valve port 22' is communicated with the first motor valve port 21, and the first battery valve port 22 is communicated with the second motor valve port 21', the heat transfer line in which the battery 92 is located is in series with the heat transfer line in which the motor 91 is located.

In an implementation in order to draw the two motor branch tubes out of the housing 1 and communicate with the motor 91, the housing may be provided with a motor connector as shown in FIG. 3. Exemplarily, referring to FIGS. 3 and 4, an end of the first motor branch tube 411 away from the first motor valve port 21 may be communicated with a motor outlet connector 413, and an end of the second motor branch tube 412 away from the second motor valve port 21' may be communicated with a motor inlet connector 414. Where since the motor 91 is arranged at the front end of the electric vehicle, both the motor inlet connector 414 and the motor outlet connector 413 can extend forward.

Similarly, in order to draw the first battery branch tube 421 and the second battery branch tube 422 located in the housing 1 out of the housing 1 and communicate with the battery 92, the housing may be provided with a battery outlet connector 424 and a battery inlet connector 423 as shown in FIG. 3. Both the battery inlet connector 423 and the battery outlet connector 424 can extend toward right to provide a mounting space for the battery water pump 62 (located in a battery water pump mounting seat 621). Referring to FIGS. 4, 5 and 8, the first motor valve port 21 and the second motor valve port 21' can be arranged up and down. The first side can also be provided with a first heat dissipation valve port 23 and a second heat dissipation valve port 23' arranged up and down. The two heat dissipation valve ports can be located between the two valve ports of the motor 91.

In an implementation, as shown in FIGS. 2-5, the motor water pump 61 may also be integrated on the housing 1. Since the motor water pump 61 generally has a large volume, the motor water pump 61 is arranged on a surface of the housing 1. The communication mode between the motor water pump 61 and the heat transfer line located in the housing 1 can also be a front-and-rear opposite communication. Specifically, the front surface of the first base body 11 may be provided with a motor water pump mounting seat 611, and a rear surface of the motor water pump mounting seat 611 may be provided with an inlet end which can be communicated with a water pump inlet tube 64 as shown in FIGS. 4 and 5. The water pump inlet tube 64 can be provided to pass through the first base body 11 and communicated with the second motor branch tube 412. In addition, in order to shorten a heat transfer path between the second motor branch tube 412 and the motor water pump 61, the motor water pump 61 may be located on the first side of the valve assembly. Similarly, another battery water pump 62 can also be provided on the second side of the valve assembly, and the battery water pump 62 can also be communicated with the second battery branch tube 422 by communicating oppositely in a front-and-rear direction.

Referring to FIGS. 1, 4 and 8, the plurality of heat transfer tube sets may also include a heat dissipation set, which can be arranged in the same layer as the motor set. The two heat dissipation branch tubes can be located between the two motor branch tubes. The heat dissipation set may include a first heat dissipation branch tube 431 and a second heat dissipation branch tube 432. The first heat dissipation branch tube 431 can communicate the first heat dissipation valve port 23 with the inlet end of the radiator 81, and the second heat dissipation branch tube 432 can communicate the second heat dissipation valve port 23' with the outlet end of the radiator 81.

Specifically, the heat dissipation branch tubes and the heat dissipation valve ports of the valve assembly can also be communicated oppositely in a front-and-rear direction. In addition, since the motor 91 mainly dissipates heat through the radiator 81, and both the motor 91 and the radiator 81 are arranged at the front end of the electric vehicle, in order to shorten the path, both the valve ports of the motor 91 and the valve ports of the radiator 81 can be arranged on the first side of the valve assembly. Referring to FIGS. 4 and 5, since both the motor water pump 61 and the water-cooled condenser 51 are arranged on the first side of the valve assembly, the motor water pump 61 may be arranged at bottom or top in order to facilitate the arrangement of the devices on the first side of the valve assembly. FIG. 4 shows an example where the motor water pump 61 is arranged at the bottom. However, the second motor valve port 21', the first heat dissipation valve port 23 and the second heat dissipation valve port 23' are all arranged in middle of the first base body 11. In order to avoid the crossing of the first heat dissipation branch tube 431 with the second motor branch tube 412 and the crossing of the second heat dissipation branch tube 432 with the second motor branch tube 412, the two heat dissipation branch tubes can be arranged between the two motor branch tubes. The two heat dissipation valve ports are arranged between the two valve ports of the motor 91.

In addition, referring to FIGS. 3 and 4, in order to draw the two heat dissipation branch tubes out of the housing 1 and communicate with the radiator 81, the housing may be provided with a heat dissipation inlet connector 433 and a heat dissipation outlet connector 434 as shown in FIG. 3. The heat dissipation inlet connector 433 and the heat dissipation outlet connector 434 can extend forward.

Continuing to refer to FIGS. 1, 4, 5 and 8, the first side may also be provided with an adapter valve port 24. The adapter valve port 24 may be located between the first heat dissipation valve port 23 and the second heat dissipation valve port 23'. The adapter valve port 24 may be communicated with the second heat dissipation valve port 23' through an adapter tube 44. The adapter tube 44 is arranged in the same layer as the heat dissipation set. The valve assembly is used to communicate the first motor valve port 21 and the first heat dissipation valve port 23 when the radiator 81 is working, and the valve assembly is also used to communicate the adapter valve port 24 with the first motor valve port 21 when the radiator 81 is not working.

Specifically, when a temperature of the motor 91 is within a preset range, the thermal manager will no longer dissipate heat from the motor 91 through the radiator 81. At this time, the heat transfer line between the motor 91 and the radiator 81 can be disconnected. Therefore, it is necessary to arrange the adapter valve port 24. Where the adapter valve port 24 and the adapter tube 44 are communicated in a cascaded and communication mode.

It should be noted that the reason why the adapter valve port 24 and the second heat dissipation valve port 23' are communicated by the adapter tube 44 rather than by a valve action of the valve assembly is that: referring to FIG. 1, interior of the valve assembly is provided with an internal line, the valve assembly can enable the internal line between two valve ports to be communicated with the two valve ports by the valve action. Each valve port has a first end and a second end, the first end is communicated with the heat transfer line, and the second end is communicated with the internal line. A flow direction of the heat transfer medium in the heat transfer line and the internal line is determined.

Exemplarily, in FIG. 1, the heat transfer medium flows into the first end of the first motor valve port 21 through the first motor branch tube 411, and can flow to the first heat dissipation valve port 23 or the adapter valve port 24 through the internal line formed by the valve action of the valve assembly. When the first motor valve port 21 is communicated with the first heat dissipation valve port 23 through the internal line, the heat transfer medium can flow out from the first heat dissipation valve port 23 through the first heat dissipation branch tube 431. After passing through the radiator 81, the heat transfer medium flows into the second heat dissipation valve port 23' through the second heat dissipation branch tube 432, and the second heat dissipation valve port 23' is then communicated with other valve port through the internal line.

Similarly, when the first motor valve port 21 is communicated with the adapter valve port 24 through the internal line, the heat transfer medium can flow out of the adapter valve port 24 by the adapter tube 44 and enter the second heat dissipation valve port 23', and the second heat dissipation valve port 23' is then communicated with other valve port through the internal line.

Referring to FIGS. 1 and 2, the front surface of the housing 1 may be provided with a water-cooled condenser 51, and the plurality of heat transfer tube sets also include a condensation set. Since the water-cooled condenser 51 needs to dissipate heat through the radiator 81, the valve port of the valve assembly communicated with the water-cooled condenser 51 is also arranged on the first side in order to avoid crossing of heat transfer lines in the housing 1. In order to shorten the flow path, the water-cooled condenser 51 may be arranged on the first side of the valve assembly.

Since both the water-cooled condenser 51 and the motor 91 dissipate heat through the radiator 81, the water-cooled condenser 51 and the motor 91 can be communicated in parallel to the thermal manager. In order to reduce the number of the valve ports of the thermal manager and the number of the heat transfer lines, the valve ports of the valve assembly can be shared by the water-cooled condenser 51 and the motor 91.

Referring to FIGS. 4-8, in an implementation, the condensation set includes a first condensation branch tube 451, the first condensation branch tube 451 is located on the rear side of the first motor branch tube 411, and the first end of the first condensation branch tube 451 is communicated with the outlet end of the water-cooled condenser 51. The first motor valve port 21, the second end of the first motor branch tube 411 and the second end of the first condensation branch tube 451 are cascaded and communicated in sequence.

Specifically, the first condensation branch tube 451 and the line of the first motor 91 are communicated in parallel to the first motor valve port 21 of the valve assembly. Referring to FIGS. 4, 6 and 8, the first condensation branch tube 451 may be arranged on the rear wall of the second base body 12. The first motor branch tube 411 may be located on the front side of the first condensation branch tube 451. The first motor branch tube 411 is provided with an outlet end that runs therethrough. The projections of the first motor valve port 21, the outlet end of the first motor branch tube 411 and the outlet end of the first condensation branch tube 451 on the second base body 12 coincide, and the first motor valve port 21, the outlet end of the first motor branch tube 411 and the outlet end of the first condensation branch tube 451 are communicated sequentially from front to rear. That is, the water-cooled condenser 51 and the motor 91 can share the first motor valve port 21.

It can be seen from the above that the heat transfer medium coming out of the second motor valve port 21' passes through the second motor branch tube 412 into the motor water pump 61. In order to reduce the number of the water pump, the heat transfer line of the water-cooled condenser 51 and the heat transfer line of the motor 91 can share one water pump. Referring to FIGS. 4-8, in an implementation, the motor water pump 61 may have an outlet end of the first motor water pump 61 and an outlet end of the second motor water pump 61. The outlet end of the first motor water pump 61 can be connected with the inlet end of the motor 91 through the motor inlet connector 414.

The outlet end of the second motor water pump 61 can be connected with the inlet end of the water-cooled condenser 51. Specifically, the first side of the valve assembly may also be provided with a first condensation valve port 31 and a second condensation valve port 31'. The condensation set may include a second condensation branch tube 452, a third condensation branch tube 453 and a fourth condensation branch tube 454. Both the second condensation branch tube 452 and the third condensation branch tube 453 can be arranged in the same layer as the motor set, and the fourth condensation branch tube 454 can be located on the rear side of the motor set. The second condensation branch tube 452 can communicate the first condensation valve port 31 with the outlet end of the second motor water pump 61. The second condensation valve port 31', the third condensation branch tube 453 and the fourth condensation branch tube 454 can be cascaded and communicated sequentially, and the fourth condensation branch tube 454 is communicated with the inlet end of the water-cooled condenser 51. The valve assembly can communicate the first condensation valve port 31 with the second condensation valve port 31' when the water-cooled condenser 51 dissipates heat through the radiator 81.

Specifically, the side wall of the motor water pump mounting seat 611 may be provided with an outlet end, the outlet end of the motor water pump 61 may be provided with a bidirectional tube 612, a front end of the bidirectional tube 612 can be communicated with the motor inlet connector 414, and a rear end of the bidirectional tube 612 can be communicated with the first condensation valve port 31 through the second condensation branch tube 452. Since the motor water pump 61 is arranged on the first side of the valve assembly, the outlet end of the motor water pump 61 is arranged on the first side of the valve assembly. There is a certain distance between the outlet end of the motor water pump 61 and the valve port of the valve assembly, so the second condensation branch tube 452 can extend toward the second side.

Where the heat transfer medium flowing from the second motor valve port 21' can enter the motor water pump 61 through the second motor branch tube 412, and flow into the bidirectional tube 612 from the outlet end of the side wall of the motor water pump mounting seat 611 under the guidance of the motor water pump 61, and is divided into two parts at the bidirectional tube 612, where one part flows to the inlet end of the motor 91 through the motor inlet connector 414, and the other part enters the first condensation valve port 31 through the second condensation branch tube 452. When it is necessary to use the water-cooled condenser 51 for heat dissipation, the first condensation valve port 31 is communicated with the second condensation valve port 31', and the heat transfer medium enters the second condensation valve port 31' through the internal line, and then enters the inlet end of the water-cooled condenser 51 through the third condensation branch tube 453 and the fourth condensation branch tube 454. Where the right side of the fourth condensation branch tube 454 is provided with an opening opposite to and communicated with the third condensation branch tube 453, and the left side of the fourth condensation branch tube 454 is provided with an opening opposite to and communicated with the inlet end of the second line of the water-cooled condenser 51.

Both the communication mode between the first condensation branch tube 451 and the water-cooled condenser 51 and the communication mode between the fourth condensation branch tube 454 and the water-cooled condenser 51 can be a front-and-rear opposite communication mode. Exemplarily, the front surface of the first base body 11 may be provided with four first mounting points 511 as shown in FIG. 2, and the water-cooled condenser 51 may be mounted to the front surface of the first base body 11 through the first mounting points 511. The first condensation branch tube 451 may be provided with a first opening corresponding to the outlet end of the second line of the water-cooled condenser 51. The outlet end of the second line of the water-cooled condenser 51 is communicated with a communication tube, which can pass through the first base body 11 and communicate with the first opening. In this way, a flow channel in a direction perpendicular to the front surface of the first base body 11 may be formed between the outlet end of the second line of the water-cooled condenser 51 and the first condensation branch tube 451. The fourth condensation branch tube 454 may be provided with a second opening corresponding to the inlet end of the second line of the water-cooled condenser 51. The inlet end of the second line of the water-cooled condenser 51 can be communicated with a communication tube, which can pass through the first base body 11 and communicate with the second opening. In this way, a flow channel perpendicular to the front surface of the first base body 11 may be formed between the inlet end of the second line of the water-cooled condenser 51 and the fourth condensation branch tube 454, so as to shorten a flow path of the heat transfer medium.

It should be noted that the reason why both the first condensation branch tube 451 and the second condensation branch tube 452 communicated with the water-cooled condenser 51 are arranged on the rear side of the motor set is that, as first can be seen from FIG. 4, the second motor branch tube 412 extends downwards, and if the fourth condensation branch tube 454 is arranged in the same layer as the second motor branch tube 412, the second motor branch tube 412 and the fourth condensation branch tube 454 will cross each other, and thus, the fourth condensation branch tube 454 is arranged in a layer after the second motor branch tube 412; in order to communicate the second condensation valve port 31' with the fourth condensation branch tube 454, the third condensation branch tube 453 is provided in the same layer as the motor set; for consistency, the first condensation branch tube 451 and the second condensation branch tube 452 are arranged in a layer after the first motor branch tube 411. In addition, referring to FIGS. 2 and 4, since the water-cooled condenser 51 is arranged on the left side of the valve assembly, the first motor branch tube 411 extends toward an upper right direction in order to avoid the water-cooled condenser 51.

Continuing to refer to FIGS. 1 and 4-9, the second side may also be provided with a first heat exchange valve port 25 and a second heat exchange valve port 25'. The rear surface of the housing 1 may be provided with a battery cooler 52. The plurality of heat transfer tube sets may also include a flat layer set and a heat exchange set, where the flat layer set is in the same layer as the motor set, and the flat layer set includes a first flat layer branch tube 461 and a second flat layer branch tube 462; and the heat exchange set is located on the rear side of the motor set, and the heat exchange set includes a first heat exchange branch tube 463 and a second heat exchange branch tube 464. The first heat exchange valve port 25, the first flat layer branch tube 461 and the first heat exchange branch tube 463 are cascaded and communicated sequentially. The second heat exchange valve port 25', the second flat layer branch tube 462 and the second heat exchange branch tube 464 are cascaded and communicated sequentially. The first heat exchange branch tube 463 is communicated with the inlet end of the battery cooler 52, and the second heat exchange branch tube 464 is communicated with the outlet end of the battery cooler 52.

Specifically, a communication mode between the flat layer set and the heat exchange valve ports can be a front-and-rear opposite communication, and a communication mode between the flat layer set and the heat exchange set can also be a front-and-rear opposite communication. A communication mode between the battery cooler 52 and the heat exchange set can also be a front-and-rear opposite communication. In addition, referring to FIG. 2, after the front surface of the first base body 11 is provided with the water-cooled condenser 51, the valve assembly, the battery water pump 62 and the motor water pump 61, there is basically no space for placing the battery cooler 52 on the front surface of the first base body 11. Therefore, the battery cooler 52 may be arranged on the rear surface of the second base body 12. The first heat exchange branch tube 463 and the second heat exchange branch tube 464 may be arranged on the rear wall of the second base body 12 as shown in FIG. 6.

It should be noted that the reason why the first heat exchange branch tube 463 and the second heat exchange branch tube 464 communicated with the battery cooler 52 are arranged on the rear side of the motor set is that, as can be seen from FIGS. 2 and 3, the battery water pump 62 is arranged on the right side of a valve set of the battery 92. As can be seen from FIG. 4, the first battery branch tube 421, the second battery branch tube 422 and the first motor branch tube 411 are all arranged on the right side of the valve assembly. Therefore, there will be no space for mounting the battery cooler 52 on the right side of the valve assembly. Therefore, the battery cooler 52 is mounted on the rear surface of the second base body 12. In addition, in order to reduce a length of the heat transfer line, the first heat exchange branch tube 463 and the second heat exchange branch tube 464 are also arranged on the rear wall of the second base body 12. That is, the heat exchange set is arranged on the rear side of the motor set. Therefore, the first heat exchange valve port 25 is communicated with the first heat exchange branch tube 463 by setting the first flat layer branch tube 461 in the same layer as the motor set; and the second heat exchange valve port 25' is communicated with the second heat exchange branch tube 464 by setting the second flat layer branch tube 462 in the same layer as the motor set.

Figure 10:
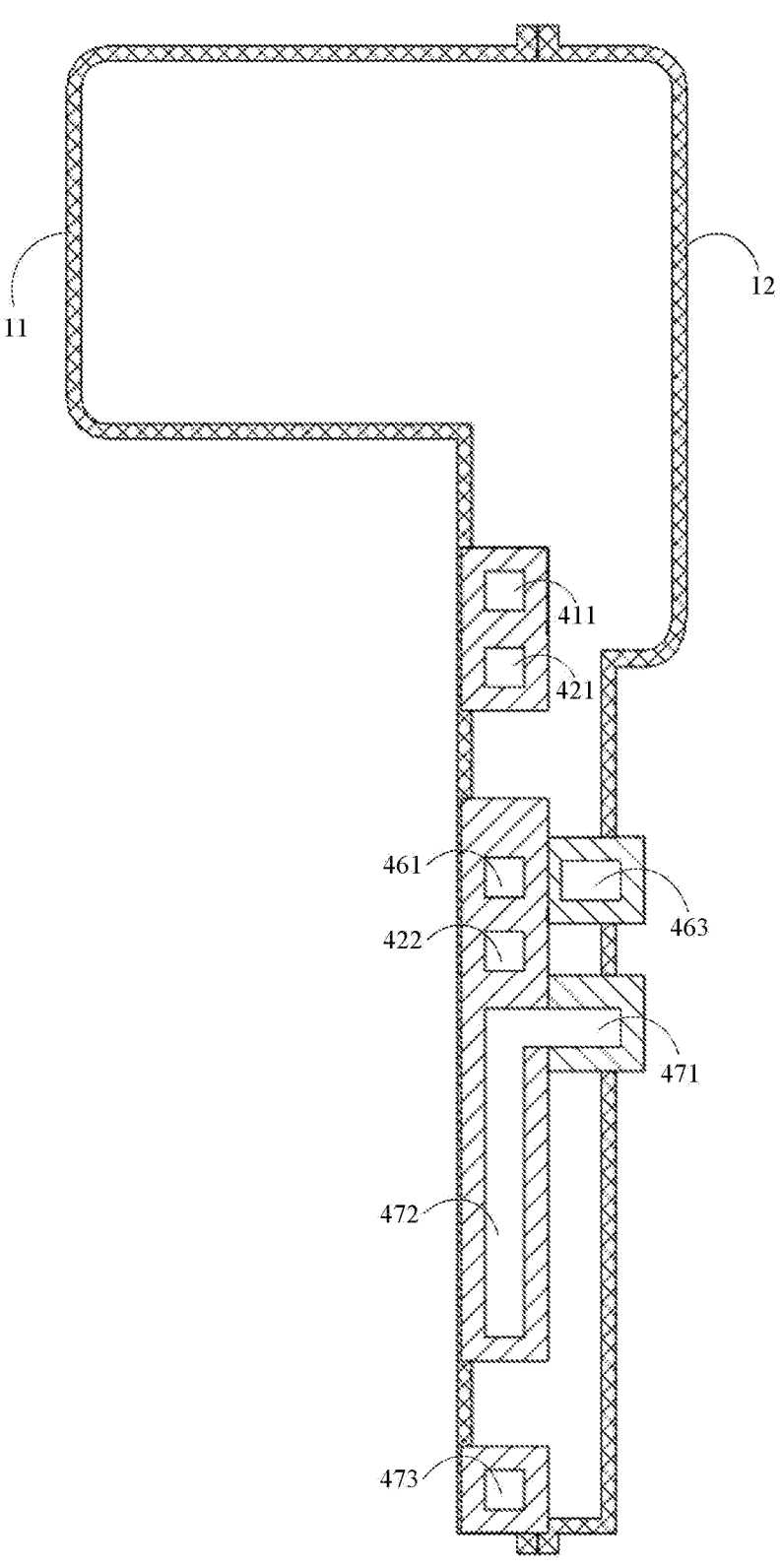
FIG. 10 is a cross-sectional view taken along C-C of FIG. 7.

FIG. 10 is a cross-sectional view taken along C-C of FIG. 7. Referring to FIGS. 1 and 4-10, in order to improve the integration of the thermal manager, the thermal manager may also be integrated with heat transfer lines for communicating an electric heater 93 and a warm air core 94. In an implementation, the second side of the valve assembly is also provided with a first electric heating valve port 32 and a second electric heating valve port 32'. The plurality of heat transfer tube sets also include an electric heating set. The electric heating set includes a first electric heating branch tube, a second electric heating branch tube 473 and a third electric heating branch tube 474. The first electric heating branch tube is used for communicating the first electric heating valve port 32 with the outlet end of the electric heater 93, the second electric heating branch tube 473 is used for communicating the second electric heating valve port 32' with the inlet end of the warm air core 94, and the third electric heating branch tube 474 is used for communicating the inlet end of the warm air core 94 with the inlet end of the electric heater 93.

Specifically, the battery 92 or the occupant cabin may be heated by the electric heater 93 and the warm air core 94. The housing 1 may also be provided with an electric heating water pump 63. As shown in FIG. 2, the electric heating water pump 63 may be mounted on the front surface of the first base body 11 by an electric heating water pump mounting seat 631. A communication mode between the electric heating set and the electric heating valve port can be a front-and-rear opposite communication, and a communication mode between the electric heating set and the electric heating water pump 63 can also be a front-and-rear opposite communication.

In an implementation, in order to draw the electric heating set out of the housing 1 and communicate with the electric heater 93 or the warm air core 94, the housing 1 may be provided with an electric heating inlet connector 475, a warm air inlet connector 476 and a warm air outlet connector 477 as shown in FIG. 3.

Referring further to FIGS. 1 and 4-10, in an implementation, the first heat exchange valve port 25 may be located between the first battery valve port 22 and the second battery valve port 22' in order to facilitate the arrangement of the battery pack, the heat exchange set and the electric heating set. The second heat exchange valve port 25' may be located below the second motor valve port 21'. The second side is also provided with a third battery valve port 33. The third battery valve port 33, the first electric heating valve port 32 and the second electric heating valve port 32 'can be arranged below the second heat exchange valve port 25' from top to bottom.

Referring to FIGS. 1 and 6, the first heat exchange branch tube 463 may have a first heat exchange outlet end and a second heat exchange outlet end. The first heat exchange outlet end is communicated with the inlet end of the battery cooler 52, and the second heat exchange outlet end is communicated with the inlet end of the electric heater 93. The second flat layer branch tube 462 is arranged in a vertical direction, a first end of the second flat layer branch tube 462 and the second heat exchange valve port 25' are cascaded and communicated, and a second end of the second flat layer branch tube 462 and the third battery valve port 33 are cascaded and communicated.

The valve assembly is used for communicating the first electric heating valve port 32 with the third battery valve port 33 and the first electric heating valve port 32 with the second electric heating valve port 32' when the battery 92 is heated by the electric heater; and allocating a ratio of flows into the third battery valve port 33 and the second electric heating valve port 32' from the first electric heating valve port 32.

Specifically, referring to FIG. 6, the inlet end of the first heat exchange branch tube 463 may be arranged in middle of the first heat exchange branch tube 463, and the first heat exchange outlet end of the first heat exchange branch tube 463 extends toward a lower left direction, and the second heat exchange outlet end of the first heat exchange branch tube 463 extends toward an upper right direction. That is, referring to FIGS. 1 and 6, the first heat exchange valve port 25 and the first heat exchange branch tube 463 are communicated in a front-and-rear opposite mode, and one part of the heat transfer medium flowing from the first heat exchange valve port 25 enters the battery cooler 52 and flows back to the second heat exchange valve port 25' through the second heat exchange branch tube 464. Another part of the heat transfer medium flowing from the first heat exchange valve port 25 enters the electric heater 93 and flows into the first electric heating valve port 32 through the first electric heating branch tube. When the battery 92 is heated by the electric heater 93, the first electric heating valve port 32 is communicated with the second electric heating valve port 32'. The heat transfer medium flows into the second electric heating valve port 32', enters the warm air core 94 through the second electric heating branch tube 473, and enters the electric heater 93 through the third electric heating branch tube 474.

In this way, the electric heater 93 and the battery cooler 52 are communicated in parallel to the first heat exchange valve port 25 of the valve assembly, and the second heat exchange outlet end of the first heat exchange branch tube 463 and the third heat exchange branch tube are communicated in parallel to the inlet end of the electric heater 93.

Referring to FIGS. 2 and 3, the electric heating water pump 63 communicating with the heat transfer line of the electric heater 93 can also be integrated on the thermal manager. In an implementation, for modular mounting, the electric heating water pump 63 may be mounted on the front surface of the first base body 11. In order to simplify the line and avoid line interference, the electric heating water pump 63 may be mounted at upper right side of the valve assembly. Referring to FIG. 6, in order to enable the second heat exchange outlet end of the first heat exchange branch tube 463 and the third heat exchange branch tube to be communicated in parallel to the inlet end of the electric heater 93. The third electric heating branch tube 474 is arranged on the rear side of the motor set. The inlet end of the electric heating water pump 63 can be provided with an inlet tube, and the second heat exchange outlet end of the first heat exchange branch tube 463 and the third heat exchange branch tube can be communicated with the inlet tube of the electric heating water pump 63. The outlet end of the electric heating water pump 63 can be communicated with the electric heater 93 through the electric heating inlet connector 475 shown in FIG. 3.

For ease of layout, the first electric heating branch tube includes a first part 471 and a second part 472, the first part 471 is located on the rear side of the motor set, the second part 472 is in the same layer as the motor set, and the second part 472 and the first part 471 are cascaded and communicated, and the second part 472 and the first electric heating valve port 32 are cascaded and communicated.

Referring further to FIGS. 1 and 4-9, the first flat layer branch tube 461 may be used for connecting the first heat exchange valve port 25 to the outlet end of the controller 95. The flat layer set may also include a third flat layer branch tube 465. A first end of the third flat layer branch tube 465 may be communicated with an end of the first battery branch tube 421 away from the first battery valve port 22, and a second end of the third flat layer branch tube 465 can be communicated with the inlet end of the controller 95, to facilitate a parallel connection of the controller 95 and the battery 92.

In an implementation, the housing 1 is also internally provided with a water storage area 7, which is located above the heat transfer tube set and is used to replenish water for the heat transfer tube set. Specifically, the water storage area 7 is placed above the heat transfer tube set so that the water in the water storage area 7 flows from high to low.

Based on the function realized by the valve assembly mentioned above, the valve assembly may include a nine-way valve 2 and a five-way valve 3 arranged up and down. The nine-way valve 2 may have nine valve ports, namely, the first motor valve port 21, the second motor valve port 21', the first battery valve port 22, the second battery valve port 22', the first heat dissipation valve port 23, the second heat dissipation valve port 23', the adapter valve port 24, the first heat exchange valve port 25, and the second heat exchange valve port 25'. The five-way valve 3 may have five valve ports, namely, the first condensation valve port 31, the second condensation valve port 31', the first electric heating valve port 32, the second electric heating valve port 32', and the third battery valve port 33.

The present application further provides an electric vehicle including a motor 91, a battery 92, a radiator 81 and the thermal manager according to the above embodiments.

Based on the embodiments in the present application, all other embodiments obtained by those skilled in the field without creative work fall within the scope of the present application. The following embodiments and the features in the embodiments may be combined with each other without conflict.

Where the terms such as "upper" and "lower" are used to describe relative position relationships of structures in the drawings, only for the sake of clarity of the description, not to limit the scope within which the present application can be implemented, and changes or adjustments of the relative position relationships thereof, in the absence of substantive changes in the technical contents, shall also be regarded as the scope within which the present application can be implemented.

It should be noted that in the present application, unless otherwise clearly specified and defined, a first feature being "above" or "below" a second feature may be refer to direct contact between the first and second features, or indirect contact between the first and second features through an intermediate medium. Moreover, the first feature being "above", "over" and "on" the second feature may be refer to that the first feature is directly or obliquely above the second feature, or only indicates that a level of the first feature is higher than that of the second feature. The first feature being "lower", "under" and "below" the second feature may be that the first feature is directly or obliquely below the second feature, or only indicates that a horizontal height of the first feature is less than that of the second feature.

In addition, in the present application, unless otherwise clearly specified and defined, the terms "mounting", "communicate", "connect" and "fixed" shall be understood in a broad sense, for example, it can be a fixed connection or a detachable connection, or as a whole; it can be directly connected, or indirectly connected through an intermediate medium, and it can be the communication between interiors of two components or interaction between two components. For those skilled in the art, the specific meanings of the above terms in the present application can be understood according to specific circumstances.

In the description of this specification, description with reference to term "one embodiment", "some embodiments", "schematic embodiments", "example", "specific example", or "some examples" means that specific features, structures, materials or features described in combination with the embodiment(s) or example(s) are included in at least one embodiment or example of the present disclosure. In this specification, the schematic representation of the above terms does not necessarily refer to the same embodiment or example. Furthermore the specific features, structures, materials or features described may be combined in an appropriate manner in any one or more embodiments or examples.

Finally, it should be noted that the above embodiments are only used to illustrate the technical solutions of the present application, not to limit them; although the present application is explained in detail with reference to the above-mentioned embodiments, those skilled in the art should understand that they can still modify the technical solution recorded in the above-mentioned embodiments or equivalently replace some or all of their technical features therein. These modifications or replacements do not make the essence of the corresponding technical solutions deviate from the scope of the technical solutions of the embodiments of the present application.

What is claimed is:

1. A thermal manager of an electric vehicle, comprising a housing, wherein a plurality of heat transfer tube sets are accommodated in the housing, and each heat transfer tube set comprises two heat transfer branch tubes, a first end of a first heat transfer branch tube in a same set is arranged to pass through the housing and is configured to connect an inlet end of a device, and a first end of a second heat transfer branch tube in the same set is arranged to pass through the housing and is configured to connect an outlet end of the same device;

a valve assembly is arranged on a front surface of the housing, and the valve assembly is provided with a plurality of valve ports, each valve port is opposite to and communicated with a second end of at least one heat transfer branch tube in a front-and-rear direction, and the two heat transfer branch tubes in the same set are each communicated with the different valve ports;

the valve assembly is configured to selectively communicate with the different valve ports when the thermal manager performs mode switching, so as to connect and disconnect a heat transfer loop in which a different device is located, wherein the valve assembly comprises a first side and a second side, and the first side is provided with a first motor valve port and a second motor valve port arranged up and down, and the second side is provided with a first battery valve port and a second battery valve port arranged up and down;

the plurality of heat transfer tube sets comprise a motor set and a battery pack, wherein the battery pack and the motor set are arranged in a same layer, the motor set comprises a first motor branch tube and a second motor branch tube, and the first motor branch tube is configured to communicate the first motor valve port with an outlet end of a motor, and the second motor branch tube is configured to communicate the second motor valve port with an inlet end of the motor;

the battery pack comprises a first battery branch tube and a second battery branch tube, the first battery branch tube is configured to communicate the first battery valve port with an outlet end of a battery, and the second battery branch tube is configured to communicate the second battery valve port with an inlet end of the battery.

2. The thermal manager of an electric vehicle according to claim 1, wherein the first side is further provided with a first heat dissipation valve port and a second heat dissipation valve port arranged up and down, and the two heat dissipation valve ports are located between the two motor valve ports;

the plurality of heat transfer tube sets further comprise a heat dissipation set, and the heat dissipation set is arranged in a same layer as the motor set and comprises a first heat dissipation branch tube and a second heat dissipation branch tube, and the two heat dissipation branch tubes are located between the two motor branch tubes, the first heat dissipation branch tube is configured to communicate the first heat dissipation valve port with an inlet end of a radiator, and the second heat dissipation branch tube is configured to communicate the second heat dissipation valve port with an outlet end of the radiator.

3. The thermal manager of an electric vehicle according to claim 2, wherein the first side is further provided with an adapter valve port, the adapter valve port is located between the first heat dissipation valve port and the second heat dissipation valve port, and the adapter valve port is communicated with the second heat dissipation valve port through an adapter tube, and the adapter tube is arranged in a same layer as the heat dissipation set;

the valve assembly is configured to communicate the first motor valve port and the first heat dissipation valve port when the radiator is working, and the valve assembly is further configured to communicate the adapter valve port with the first motor valve port when the radiator is not working.

4. The thermal manager of an electric vehicle according to claim 2, wherein the front surface of the housing is further provided with a water-cooled condenser, and the plurality of heat transfer tube sets further comprise a condensation set;

the condensation set comprises a first condensation branch tube, the first condensation branch tube is located on a rear side of the first motor branch tube, and a first end of the first condensation branch tube is communicated with an outlet end of the water-cooled condenser, the first motor valve port, a second end of the first motor branch tube and a second end of the first condensation branch tube are opposite to and communicated with each other in sequence in a front-and-rear direction; and/or the front surface of the housing is provided with a motor water pump, the motor water pump is located on the first side of the valve assembly, and an inlet end of the motor water pump is opposite to and communicated with the second motor branch tube in a front-and-rear direction, the motor water pump is provided with a first motor water pump outlet end and a second motor water pump outlet end, and the first motor water pump outlet end is configured to communicate with the inlet end of the motor;

the first side is further provided with a first condensation valve port and a second condensation valve port, and the condensing set comprises a second condensation branch tube, a third condensation branch tube and a fourth condensation branch tube, the second condensation branch tube and the third condensation branch tube are arranged in a same layer as the motor set, and the fourth condensation branch tube is located on a rear side of the motor set, the second condensation branch tube is configured to communicate the first condensation valve port with an outlet end of the second motor water pump, and the second condensation valve port, the third condensation branch tube and the fourth condensation branch tube are opposite to and communicated with each other in a front-and-rear direction, and the fourth condensation branch tube is communicated with an inlet end of the water-cooled condenser;

the valve assembly is configured to communicate the first condensation valve port and the second condensation valve port when the water-cooled condenser dissipates heat through the radiator.

5. The thermal manager of an electric vehicle according to claim 1, wherein the second side is further provided with a first heat exchange valve port and a second heat exchange valve port;

a rear surface of the housing is provided with a battery cooler, and the plurality of heat transfer tube sets further comprise a flat layer set and a heat exchange set, wherein the flat layer set is in a same layer as the motor set, and the flat layer set comprises a first flat layer branch tube and a second flat layer branch tube, the heat exchange set is located at a rear side of the motor set, and the heat exchange set comprises a first heat exchange branch tube and a second heat exchange branch tube, the first heat exchange valve port, the first flat layer branch tube and the first heat exchange branch tube are opposite to and communicated with each other in sequence in a front-and-rear direction, and the second heat exchange valve port, the second flat layer branch tube and the second heat exchange branch tube are opposite to and communicated with each other in sequence in a front-and-rear direction, the first heat exchange branch tube is communicated with an inlet end of the battery cooler, and the second heat exchange branch tube is communicated with an outlet end of the battery cooler.

6. The thermal manager of an electric vehicle according to claim 2, wherein the second side is further provided with a first heat exchange valve port and a second heat exchange valve port;

a rear surface of the housing is provided with a battery cooler, and the plurality of heat transfer tube sets further comprise a flat layer set and a heat exchange set, wherein the flat layer set is in a same layer as the motor set, and the flat layer set comprises a first flat layer branch tube and a second flat layer branch tube, the heat exchange set is located at a rear side of the motor set, and the heat exchange set comprises a first heat exchange branch tube and a second heat exchange branch tube, the first heat exchange valve port, the first flat layer branch tube and the first heat exchange branch tube are opposite to and communicated with each other in sequence in a front-and-rear direction, and the second heat exchange valve port, the second flat layer branch tube and the second heat exchange branch tube are opposite to and communicated with each other in sequence in a front-and-rear direction, the first heat exchange branch tube is communicated with an inlet end of the battery cooler, and the second heat exchange branch tube is communicated with an outlet end of the battery cooler.

7. The thermal manager of an electric vehicle according to claim 3, wherein the second side is further provided with a first heat exchange valve port and a second heat exchange valve port;

a rear surface of the housing is provided with a battery cooler, and the plurality of heat transfer tube sets further comprise a flat layer set and a heat exchange set, wherein the flat layer set is in a same layer as the motor set, and the flat layer set comprises a first flat layer branch tube and a second flat layer branch tube, the heat exchange set is located at a rear side of the motor set, and the heat exchange set comprises a first heat exchange branch tube and a second heat exchange branch tube, the first heat exchange valve port, the first flat layer branch tube and the first heat exchange branch tube are opposite to and communicated with each other in sequence in a front-and-rear direction, and the second heat exchange valve port, the second flat layer branch tube and the second heat exchange branch tube are opposite to and communicated with each other in sequence in a front-and-rear direction, the first heat exchange branch tube is communicated with an inlet end of the battery cooler, and the second heat exchange branch tube is communicated with an outlet end of the battery cooler.

8. The thermal manager of an electric vehicle according to claim 4, wherein the second side is further provided with a first heat exchange valve port and a second heat exchange valve port;

a rear surface of the housing is provided with a battery cooler, and the plurality of heat transfer tube sets further comprise a flat layer set and a heat exchange set, wherein the flat layer set is in a same layer as the motor set, and the flat layer set comprises a first flat layer branch tube and a second flat layer branch tube, the heat exchange set is located at a rear side of the motor set, and the heat exchange set comprises a first heat exchange branch tube and a second heat exchange branch tube, the first heat exchange valve port, the first flat layer branch tube and the first heat exchange branch tube are opposite to and communicated with each other in sequence in a front-and-rear direction, and the second heat exchange valve port, the second flat layer branch tube and the second heat exchange branch tube are opposite to and communicated with each other in sequence in a front-and-rear direction, the first heat exchange branch tube is communicated with an inlet end of the battery cooler, and the second heat exchange branch tube is communicated with an outlet end of the battery cooler.

9. The thermal manager of an electric vehicle according to claim 5, wherein the first flat layer branch tube is configured to communicate the first heat exchange valve port with an outlet end of a controller, the flat layer set further comprises a third flat layer branch tube, a first end of the third flat layer branch tube is communicated with an end of the first battery branch tube away from the first battery valve port, and a second end of the third flat layer branch tube is configured to communicate with an inlet end of the controller.

10. The thermal manager of an electric vehicle according to claim 6, wherein the first flat layer branch tube is configured to communicate the first heat exchange valve port with an outlet end of a controller, the flat layer set further comprises a third flat layer branch tube, a first end of the third flat layer branch tube is communicated with an end of the first battery branch tube away from the first battery valve port, and a second end of the third flat layer branch tube is configured to communicate with an inlet end of the controller.

11. The thermal manager of an electric vehicle according to claim 7, wherein the first flat layer branch tube is configured to communicate the first heat exchange valve port with an outlet end of a controller, the flat layer set further comprises a third flat layer branch tube, a first end of the third flat layer branch tube is communicated with an end of the first battery branch tube away from the first battery valve port, and a second end of the third flat layer branch tube is configured to communicate with an inlet end of the controller.

12. The thermal manager of an electric vehicle according to claim 8, wherein the first flat layer branch tube is configured to communicate the first heat exchange valve port with an outlet end of a controller, the flat layer set further comprises a third flat layer branch tube, a first end of the third flat layer branch tube is communicated with an end of the first battery branch tube away from the first battery valve port, and a second end of the third flat layer branch tube is configured to communicate with an inlet end of the controller.

13. The thermal manager of an electric vehicle according to claim 5, wherein the second side is further provided with a first electric heating valve port and a second electric heating valve port;

the plurality of heat transfer tube sets further comprise an electric heating set, which comprises a first electric heating branch tube, a second electric heating branch tube and a third electric heating branch tube, wherein the first electric heating branch tube is configured to communicate the first electric heating valve port with an outlet end of an electric heater, and the second electric heating branch tube is configured to communicate the second electric heating valve port with an inlet end of a warm air core, the third electric heating branch tube is configured to communicate the outlet end of the warm air core with an inlet end of the electric heater.

14. The thermal manager of an electric vehicle according to claim 6, wherein the second side is further provided with a first electric heating valve port and a second electric heating valve port;

the plurality of heat transfer tube sets further comprise an electric heating set, which comprises a first electric heating branch tube, a second electric heating branch tube and a third electric heating branch tube, wherein the first electric heating branch tube is configured to communicate the first electric heating valve port with an outlet end of an electric heater, and the second electric heating branch tube is configured to communicate the second electric heating valve port with an inlet end of a warm air core, the third electric heating branch tube is configured to communicate the outlet end of the warm air core with an inlet end of the electric heater.

15. The thermal manager of an electric vehicle according to claim 7, wherein the second side is further provided with a first electric heating valve port and a second electric heating valve port;

the plurality of heat transfer tube sets further comprise an electric heating set, which comprises a first electric heating branch tube, a second electric heating branch tube and a third electric heating branch tube, wherein the first electric heating branch tube is configured to communicate the first electric heating valve port with an outlet end of an electric heater, and the second electric heating branch tube is configured to communicate the second electric heating valve port with an inlet end of a warm air core, the third electric heating branch tube is configured to communicate the outlet end of the warm air core with an inlet end of the electric heater.

16. The thermal manager of an electric vehicle according to claim 13, wherein the first heat exchange valve port is located between the first battery valve port and the second battery valve port, and the second heat exchange valve port is located below the second motor valve port, and the second side is further provided with a third battery valve port, the third battery valve port, the first electric heating valve port and the second electric heating valve port are arranged below the second heat exchange valve port in sequence from top to bottom;

the first heat exchange branch tube has a first heat exchange outlet end and a second heat exchange outlet end, the first heat exchange outlet end is communicated with the inlet end of the battery cooler, and the second heat exchange outlet end is communicated with the inlet end of the electric heater, the second flat layer branch tube is arranged in a vertical direction, a first end of the second flat layer branch tube is opposite to and communicated with the second heat exchange valve port in a front-and-rear direction, and a second end of the second flat layer branch tube is opposite to and communicated with the third battery valve port in a front-and-rear direction;

the valve assembly is configured to communicate the first electric heating valve port with the third battery valve port, and the first electric heating valve port with the second electric heating valve port when a battery is heated by the electric heater, and allocate a ratio of flows into the third battery valve port and the second electric heating valve port from the first electric heating valve port.

17. The thermal manager of an electric vehicle according to claim 16, wherein the third electric heating branch tube is arranged on the rear side of the motor set, and the front surface of the housing is further provided with an electric heating water pump, the third electric heating branch tube and the second heat exchange outlet end of the first heat exchange branch tube are communicated in parallel to an inlet end of the electric heating water pump, and an outlet end of the electric heating water pump is communicated with the inlet end of the electric heater; and/or the first electric heating branch tube comprises a first part and a second part, the first part is located on the rear side of the motor set, the second part is in a same layer as the motor set, and the second part and the first part are opposite to and communicated with each other in a front-and-rear direction, and the second part and the first electric heating valve port are opposite to and communicated with each other in a front-and-rear direction.

18. The thermal manager of an electric vehicle according to claim 1, wherein the housing is further provided with a water storage area, the water storage area is located above the heat transfer tube sets and is configured to replenish water for the heat transfer tube sets; and/or the housing is further provided with a gas-liquid separator, a part of an air conditioning line, a stop valve and an expansion valve.

19. An electric vehicle, comprising a motor, a battery, a radiator and the thermal manager according to claim 1.

* * * * *